(12) United States Patent
Wen et al.

(10) Patent No.: US 7,838,802 B2
(45) Date of Patent: Nov. 23, 2010

(54) RADIATION APPARATUS WITH CAPABILITY OF PREVENTING HEAT CONVECTION

(75) Inventors: Bor-Jiunn Wen, Hsinchu (TW); Hsin-Yi Ko, Taipei (TW)

(73) Assignee: Industrial Technology Research Institute, Hsin-Chu (TW)

( * ) Notice: Subject to any disclaimer, the term of this patent is extended or adjusted under 35 U.S.C. 154(b) by 572 days.

(21) Appl. No.: 11/967,215

(22) Filed: Dec. 30, 2007

(65) Prior Publication Data
US 2009/0139975 A1 Jun. 4, 2009

(30) Foreign Application Priority Data
Nov. 30, 2007 (TW) .............................. 96145529 A

(51) Int. Cl.
*F27B 14/00* (2006.01)
*G01K 15/00* (2006.01)
(52) U.S. Cl. .................... 219/420; 219/385; 219/407; 219/391; 219/395; 219/396; 219/409; 373/111; 373/117; 373/128; 373/130; 373/132; 373/134; 373/137; 373/129; 373/131; 373/133
(58) Field of Classification Search .............. 219/420, 219/385, 407, 391, 395–6, 409; 373/111, 373/117, 128–137; 374/2
See application file for complete search history.

(56) References Cited
U.S. PATENT DOCUMENTS

| 5,265,958 | A | 11/1993 | Ludlow |
| 5,756,992 | A | 5/1998 | Spindler |
| 6,447,160 | B1 | 9/2002 | Fraden |
| 7,148,450 | B2 | 12/2006 | Lin et al. |

FOREIGN PATENT DOCUMENTS
TW 467271 12/2001

*Primary Examiner*—Shawntina Fuqua
(74) *Attorney, Agent, or Firm*—WPAT, PC; Justin King

(57) ABSTRACT

The present invention provides a radiation apparatus with capability of preventing heat convection, which comprises a blackbody furnace having a cavity therein and an air pressure adjusting unit. The air pressure adjusting unit coupled to the blackbody furnace for adjusting the air pressure of the open end of the cavity according to the temperature difference between the cavity and the outside environment. By means of the design of the present invention, it is capable of preventing heat convection between the cavity and the outside environment by utilizing the air pressure adjusting unit for controlling the air pressure status around the open end of cavity such that the blackbody furnace is stable for services of calibrations and tests.

20 Claims, 11 Drawing Sheets

RADIATION APPARATUS WITH CAPABILITY OF PREVENTING HEAT CONVECTION

FIELD OF THE INVENTION

The present invention relates to a standard radiation apparatus, and more particularly, to a radiation apparatus with capability of preventing heat convention that is capable of using the effect of atmosphere variation to prevent heat convention.

BACKGROUND OF THE INVENTION

Non-contact thermometers, such as infrared thermography equipments and radiation thermometers, currently are being used in a wide range of industrial and laboratory temperature control applications. By using non-contact temperature sensors, objects that are difficult to reach due to extreme environmental conditions can be monitored. They can also be used for products that cannot be contaminated by a contact sensor, such as in the glass, chemical, pharmaceutical, and food industries. Non-contact sensors can be used when materials are hot, moving, or inaccessible, or when materials cannot be damaged, scratched, or torn by a contact thermometer, so that these devices are now widely used throughout industry to record and control industrial processes. It is critical for any such non-contact radiation thermometer to be able to accurately convert the output of its detector into a value representing object temperature.

Currently, most common non-contact thermometers, such as infrared thermography equipments, radiation thermometers, or even those IR ear thermometers that are most welcome in SAR period, are heavily rely on blackbody radiation for calibration. However, when the temperature of a standard blackbody radiator is lower than its ambient temperature, by convention effect, gases outside the blackbody radiator will flow into the blackbody radiator for heat exchange and thus cause mist to be formed on the wall of the blackbody radiator. In certain extreme conditions when the blackbody radiator's temperature is lower than 0° C., mist will become frost and ice that is going to cause damage to the blackbody radiator. On the other hand, when the temperature of a standard blackbody radiator is higher than its ambient temperature, also by convention, heat exchanging is going to happen between the gases inside the blackbody radiator and those outside the same. Since the ambient temperature of the blackbody radiator is easily affected by air flow and other environmental factors so that it is varying, such heat exchanging will cause temperature drift to the blackbody radiator. Therefore, it is important to have a stable blackbody radiator that is free from being affected by thermal convection.

Most current non-contact thermometers are calibrated by the use of a cavity-type or plate-type blackbody source. Nevertheless, as those non-contact thermometers are mostly used when materials are hot, moving, or inaccessible, the calibration temperature of those blackbody sources, no matter it is cavity-type or plate-type, are all being configured at a temperature above its ambient temperature. Thus, the aforementioned thermal convection will not cause frost or ice to be formed on the wall of the blackbody source where there can be at most a little moisture. Moreover, in most cases, the temperature of the blackbody source is usually much higher than its ambient temperature that even if there is moisture formed on its wall, the wetness can be evaporated soon enough if the temperature of the blackbody source is high enough. Therefore, by configuring the temperature of the blackbody source at a specific temperature for establishing a heat balance with ambient temperature which should be stabilized, a stable standard blackbody radiator can be achieved.

However, when the fear of SAR in Year 2003 causes the popularization of IR ear thermometers, the accuracy as well as the calibration of those IR ear thermometers is becoming important issues. Consequently, there are more and more researches have focused their studies on middle-/low-temperature blackbody radiators that are used for IR ear thermometer calibration. On such study is a portable blackbody furnace suitable for the temperature calibration of radiation thermometers, disclosed in U.S. Pat. No. 7,148,450. Moreover, some studies come up with a concept of non-plate-type multi-source blackbody radiator as those disclosed in U.S. Pat. Nos. 5,265,958 and 5,756,992. In U.S. Pat. No. 5,265,958, a plurality of block-shaped blackbody sources are used in cooperation with a porous plate for forming a multi-source blackbody radiator suitable for testing thermal imagers. In U.S. Pat. No. 5,756,992, a blackbody simulating apparatus is provided which comprise: a blackbody simulator, for emitting infrared energy in random directions; a collimator, for collecting a portion of the infrared radiation emitted by the blackbody simulator and then redirects the infrared radiation to a dielectric; the dielectric, having a thin metallic coating affixed to its rear surface to form a mirror like surface at its rear surface. Thereby, a primary reflection of the collimated beam occurs at the front surface of the dielectric resulting in a first blackbody image being directed to an infrared imager; while a portion of the collimated beam passes through the dielectric to the metallic coating and is then reflected by the metallic coating to the front surface of the dielectric emerging from the dielectric as a second blackbody image which is also directed to the infrared imager. Additional blackbody images are generated by internal reflections within the dielectric with each blackbody image having a different intensity from the other blackbody images. This results in at least two different radiance levels being supplied to the infrared imager for calibrating the infrared imager. Nevertheless, In U.S. Pat. No. 6,447,160, a blackbody cavity, which is the most common commercial cavity-type blackbody source, is used for calibration of infrared thermometers since it is proven that such cavity-type blackbody source is more stable and has better emissivity than the block-shaped blackbody source.

However, all the aforesaid studies including cavity-type and block-shape blackbody sources did not provide means for preventing thermal convention. Only in TW Pat. No. 467271, a blackbody furnace 11 is provided that can prevent air surrounding the blackbody furnace 11 from even come near to the furnace opening to enter the radiation cavity 12 for generating thermal convention by the use of an extending tube 14 to tightly combine the outer wall of the blackbody furnace 11 with a thermometer 16, as shown in FIG. 1. However, it is obvious that the extending tube 14 should be designed with various sizes and lengths so as to be adapted for calibrating thermometers 16 of various sizes and measuring distances. Therefore, the aforesaid blackbody furnace can be too complicated to be realized. In addition, it is difficult to design an extending tube 14 that can tightly combine the outer wall of the blackbody furnace 11 with the thermometer 16.

SUMMARY OF THE INVENTION

The object of the present invention is to provide a radiation apparatus with capability of preventing heat convention, configured with a mechanism capable of controlling the air pressure of a blackbody furnace's cavity for preventing a heat convention from happening between the interior of the blackbody furnace' cavity and its surrounding environment, by which not only the performance of the blackbody furnace is enhanced, but also the blackbody furnace is able to act as a blackbody radiator with high temperature stability to be used for calibration.

To achieve the above object, the present invention provides a radiation apparatus with capability of preventing heat convention, comprising: a blackbody furnace having a cavity formed therein; and an air pressure adjusting unit, coupled to the blackbody furnace for adjusting the air pressure at the opening of the cavity according to the temperature difference between the cavity and the ambient environment surrounding the blackbody furnace.

In an exemplary embodiment of the invention, another radiation apparatus with capability of preventing heat convention is provided, which comprises: a storage tank, for storing a fluid; a blackbody furnace, having a cavity formed therein and being arranged inside the storage tank in a manner that the opening of the cavity is located at a sidewall of the storage tank; and an air pressure adjusting unit, coupled to the blackbody furnace for adjusting the air pressure at the opening of the cavity according to the temperature difference between the cavity and the ambient environment surrounding the blackbody furnace.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 2:
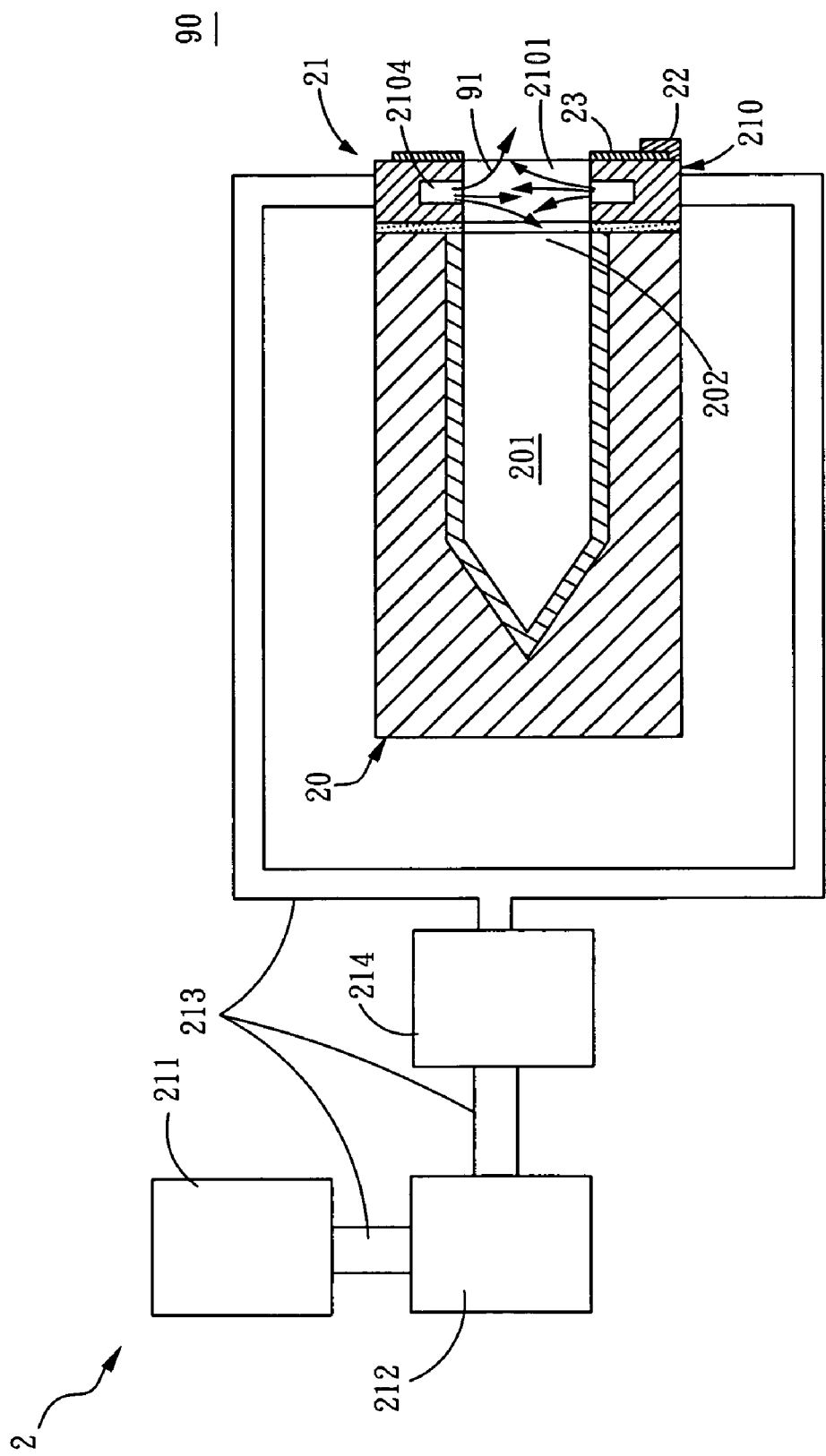
FIG. 2 is a side view of a radiation apparatus with capability of preventing heat convention according to a first embodiment of the invention.

Please refer to FIG. 2, which is a side view of a radiation apparatus with capability of preventing heat convention according to a first embodiment of the invention. The radiation apparatus of FIG. 2 comprises a blackbody furnace 20 and an air pressure adjusting unit 21. The blackbody furnace 20 is configured with a cavity 201 with an opening 202 formed at an end thereof. The air pressure adjusting unit 21 is coupled to blackbody furnace 20 for adjusting the air pressure at the opening 202 of the cavity 201 according to the temperature difference between the cavity 201 and the ambient environment 90 surrounding the blackbody furnace 20.

In this embodiment, the air pressure adjusting unit 21 further comprises a pressure adjuster 210, a gas controller 211 and a temperature controller 212. The pressure controller 210 is arranged at the opening of the blackbody furnace for generating a positive pressure or a negative pressure to be used for preventing a heat convention effect from happening between the ambient environment 90 and the cavity 201. Please refer to FIG. 3A, which is a cross sectional diagram showing an air pressure adjusting unit according to an exemplary embodiment of the invention. As the exemplary embodiment shown in FIG. 3A, the cross section of the frame 2100 of the pressure adjuster 210 is in a circular shape, which is configured with an opening 2101 at the center thereof while enabling the opening 2101 to communicate with the opening 202 of the cavity 201. Moreover, there are a plurality of via holes 2102 formed on the frame 2100 which is provided for air flow caused by the positive or the negative pressure of the pressure controller 210 to flow therethrough, and each via hole 2101 is in communication with a circular flow duct 2103 which is further channeled with a plurality of nozzles 2104, thereby, the nozzles 2104 is in communication with the via holes 2101.

Figure 3B:
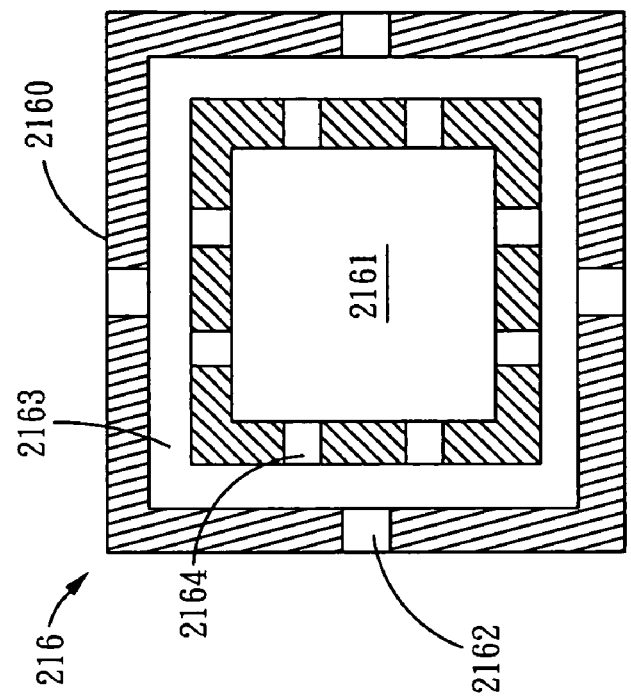
FIG. 3B is a cross sectional diagram showing an air pressure adjusting unit according to another exemplary embodiment of the invention.
Figure 3A:
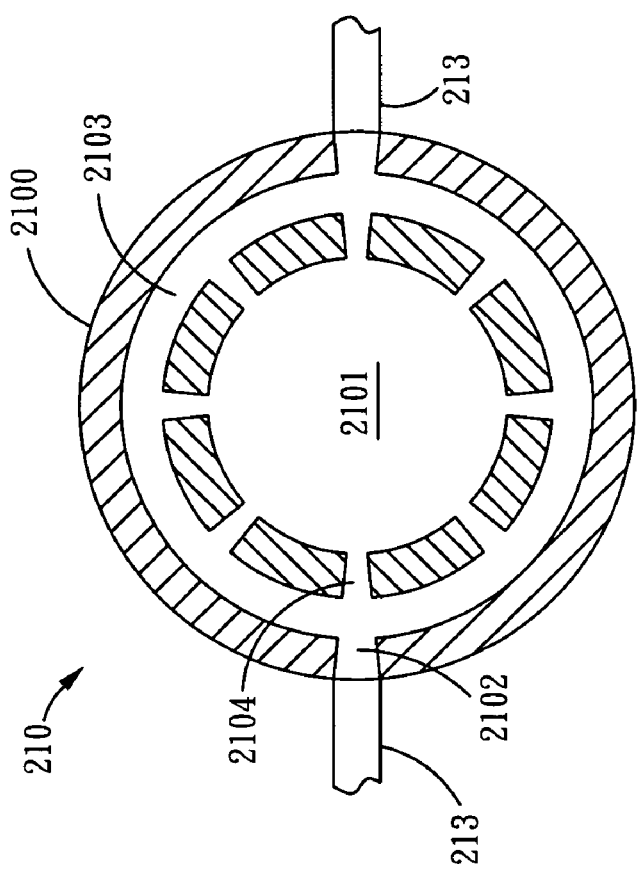
FIG. 3A is a cross sectional diagram showing an air pressure adjusting unit according to an exemplary embodiment of the invention.

Although there are two via holes 2102 and eight nozzles 2104 shown in the exemplary embodiment of FIG. 3A, their numbers are not limited thereby and can be determined depending upon actual requirement. In addition, although the frame 2100 of the pressure adjuster 210 is shaped like a circular, but it is not limited thereby and there can be pressure adjuster 210 of other geometrical shapes determined depending upon actual requirement. Please refer to FIG. 3B, which is a cross sectional diagram showing an air pressure adjusting unit according to another exemplary embodiment of the invention. In FIG. 3B, the frame 2160 of the pressure adjuster 216 is shaped like a rectangle, which is also configured with an opening 2161 at the center thereof. Similarly, the frame 2160 is also configured with a plurality of via holes. A flow duct 2163 and a plurality of nozzles 2164.

As shown in FIG. 2, the gas controller 211 is coupled to the via holes 2102 of the pressure adjuster 210 by a tube 213 for enabling the same to base upon the temperature difference between the cavity 201 and the ambient environment 90 surrounding the blackbody furnace 20 to perform an operation selected from the group consisting: performing an air-blowing operation to provide a gas to the pressure adjuster 210 for generating an positive-pressure air curtain; performing an air-extracting operation to draw the gas out of the pressure adjuster 210 for generating a negative-pressure air curtain. It is noted that the gas controller 211 can be an air pump with blowing and extracting abilities. In FIG. 2, the gas controller 211 is performing an air-blowing operation to provide the gas to the pressure adjuster 210 for generating an positive-pressure air curtain 91.

The temperature controller 212 is coupled to the gas controller 211 for controlling the gas temperature of the gas controller 211. The temperature controller 212 can be activated the same time when the gas controller 211 is enabled to perform the air-blowing operation so that the gas of the gas controller 211 can be heated to a temperature equal to that of those always inside the cavity 201, and thereby, there will be no mist or even frost and ice to be formed inside the blackbody furnace 20, nor will the temperature of the blackbody furnace 20 will be affected. It is noted that the temperature controller 212 can be basically a container provided for the tube 213 to inserted therein, in which as the container is configured with heating plate or heating tube and has a heat absorbing fluid as well as other material stored therein, the gas flowing inside the tube 213 can be heated. However, there can be other type of heating method capable of being adopted by the temperature controller 212 which are known to those skilled in the art and thus are not described further herein.

Figure 4:
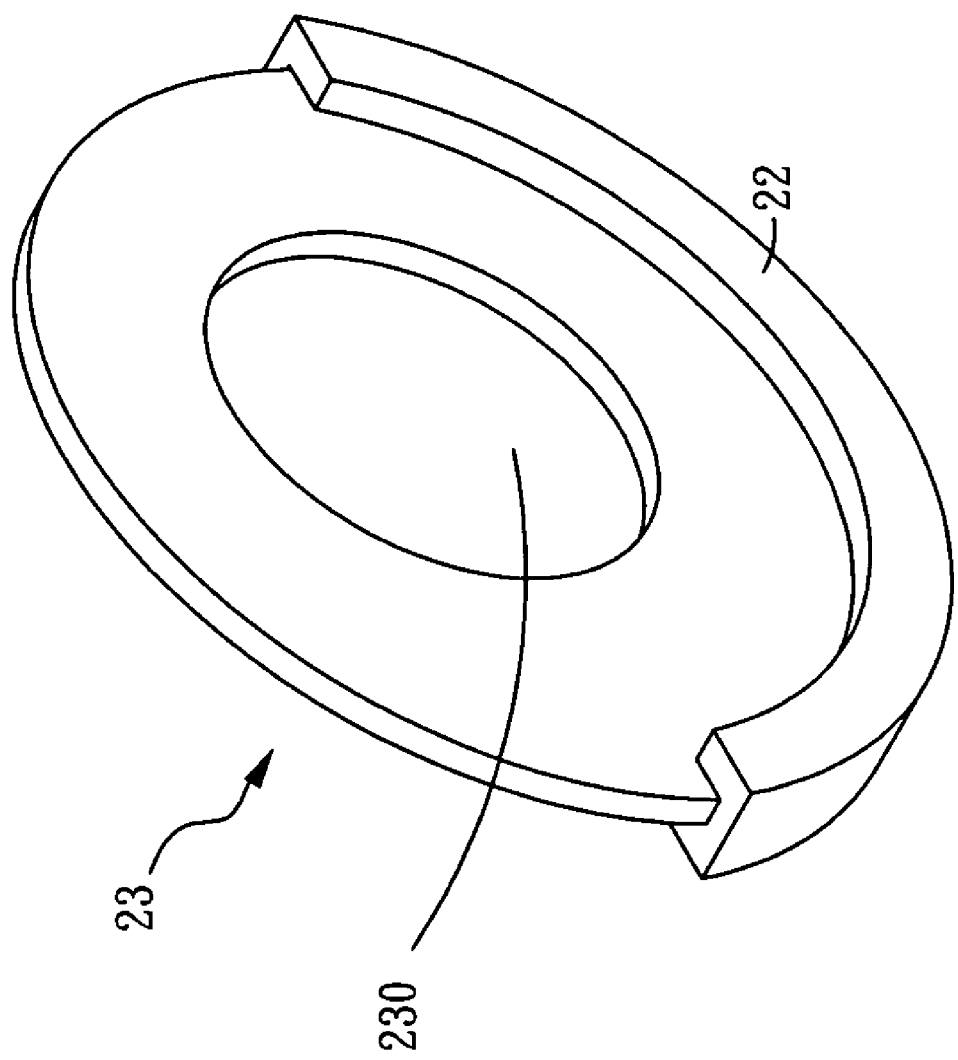
FIG. 4 is a three-dimensional diagram showing the insetting of a baffle plate into its corresponding plate gutter.
Figures 5A, 5B, 5C:
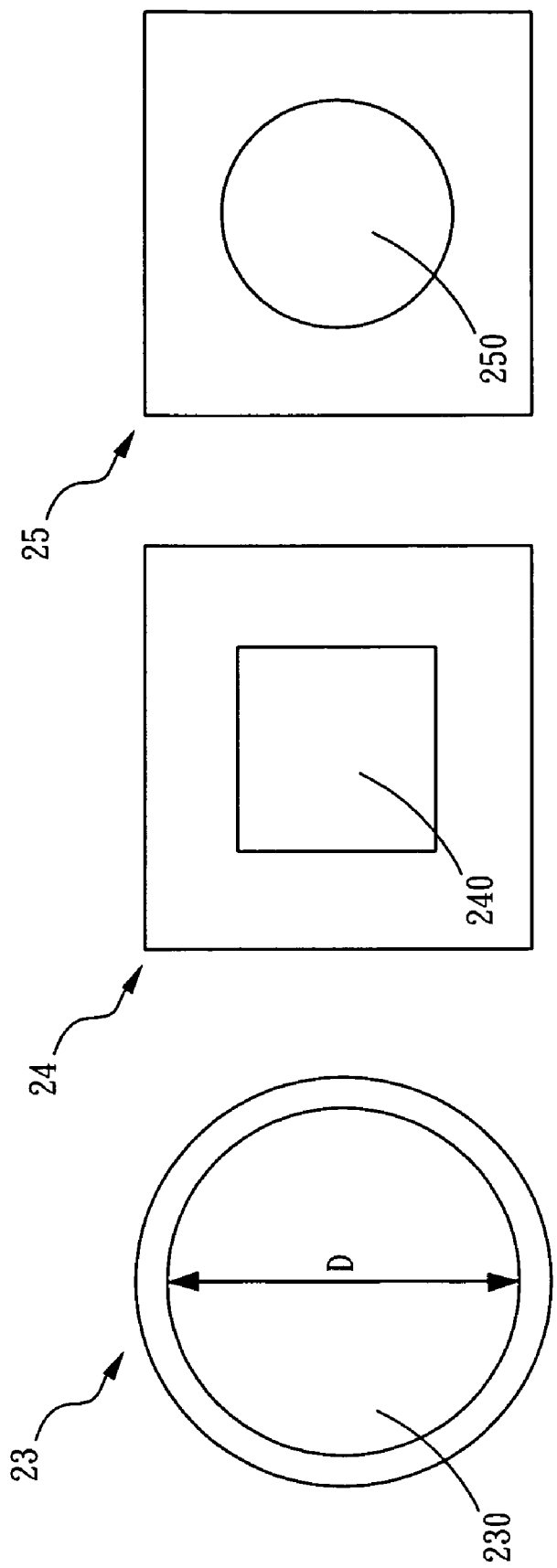
FIG. 5A to FIG. 5C are schematic diagrams showing various baffle plates capable of being used in the radiation apparatus of the invention.

Clearly, for preventing the gas flowing inside the tube 213 from the affection of the ambient environment 90, the tube 213 can be wrapped by an thermal insulating material for ensuring there's no gas temperature difference between the temperature controller 212 and the pressure adjuster 210. Moreover, according to the status of the cavity's opening, a flow controller 214 can be used for gas flow regulation for ensuring the formation of a stable air curtain. The flow controller 214 can be a throttle valve or other solenoid valves of similar functionality that are known to those skilled in the art and thus are not described further herein. As shown in FIG. 2 and FIG. 4, there is a plate gutter 22 formed on the pressure adjuster 210, which is provided for allowing a baffle plate 23 to inset therein. As the plate gutter 22 can be used for insetting different baffle plates 23 configured with a hole of different diameters, the diameter of the cavity's opening can be changed accordingly for matching the calibration requirements of different thermometers. For instance, a larger opening is needed for calibrating the infrared thermography equipments, a medium-sized opening is needed for radiation thermometers, and a smaller opening is suitable for IR ear thermometers calibration. Please refer to FIG. 5*a* to FIG. 5C, which are schematic diagrams showing various baffle plates capable of being used in the radiation apparatus of the invention. In FIG. 5A, the baffle plate 23 is a circular-shaped plate having an opening 230 formed at the center thereof, and the diameter D of the opening 230 is determined according to actual requirement. In FIG. 5 B and FIG. 5C, the baffle plates 23 are rectangle-shaped plate having a rectangle opening 240 and a circular opening 250 in respective. It is noted that the opening can be in other geometrical shapes, such as a polygon. Thus, the shapes of the baffle plate as well as that of its opening can be determined basing upon actual requirement and therefore are not limited by the aforesaid embodiments.

Figure 6A:
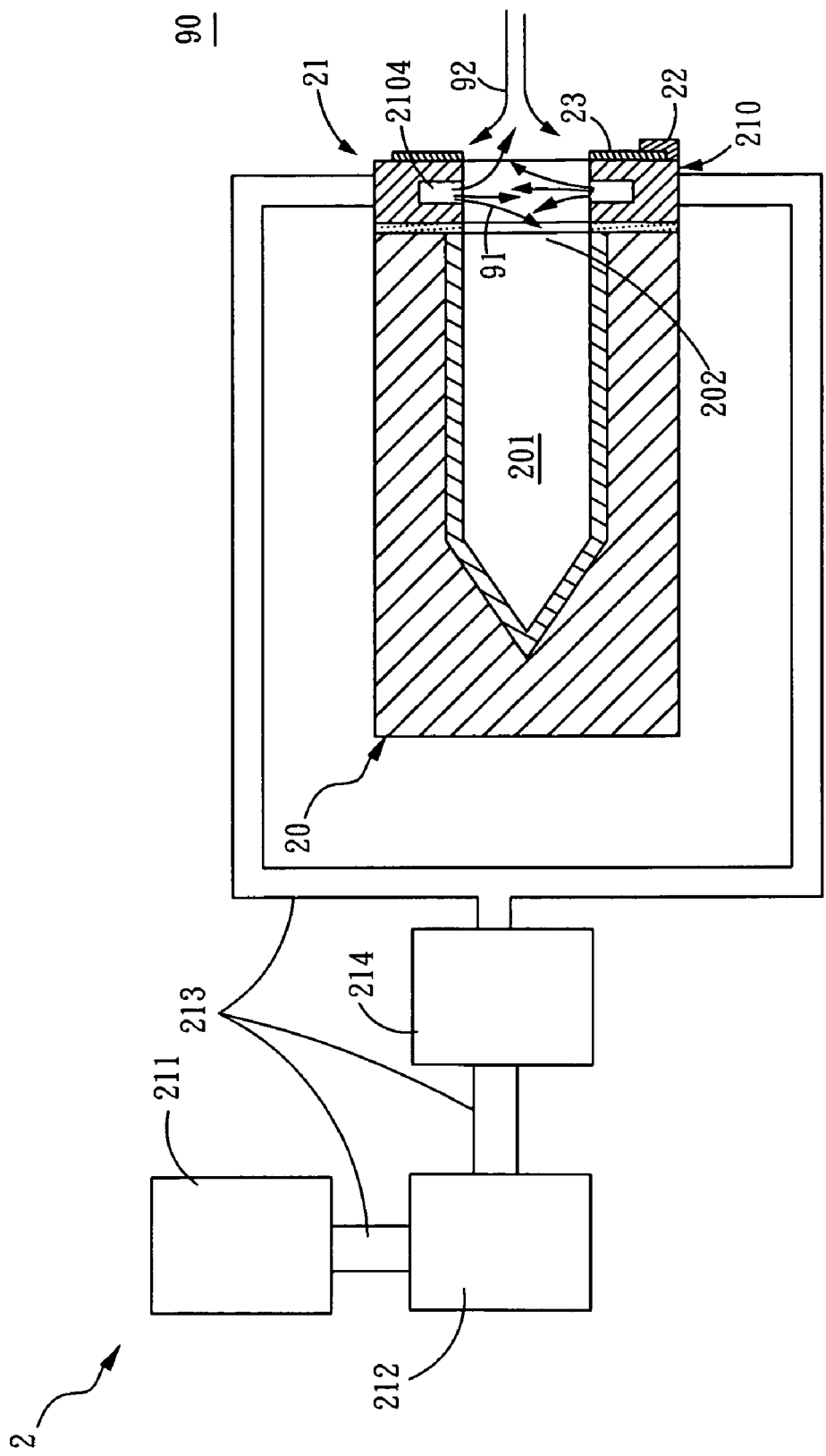
FIG. 6A to FIG. 6B are a serial of schematic diagrams showing successive steps of an operating radiation apparatus with capability of preventing heat convention according to a first embodiment of the invention.
Figure 6B:
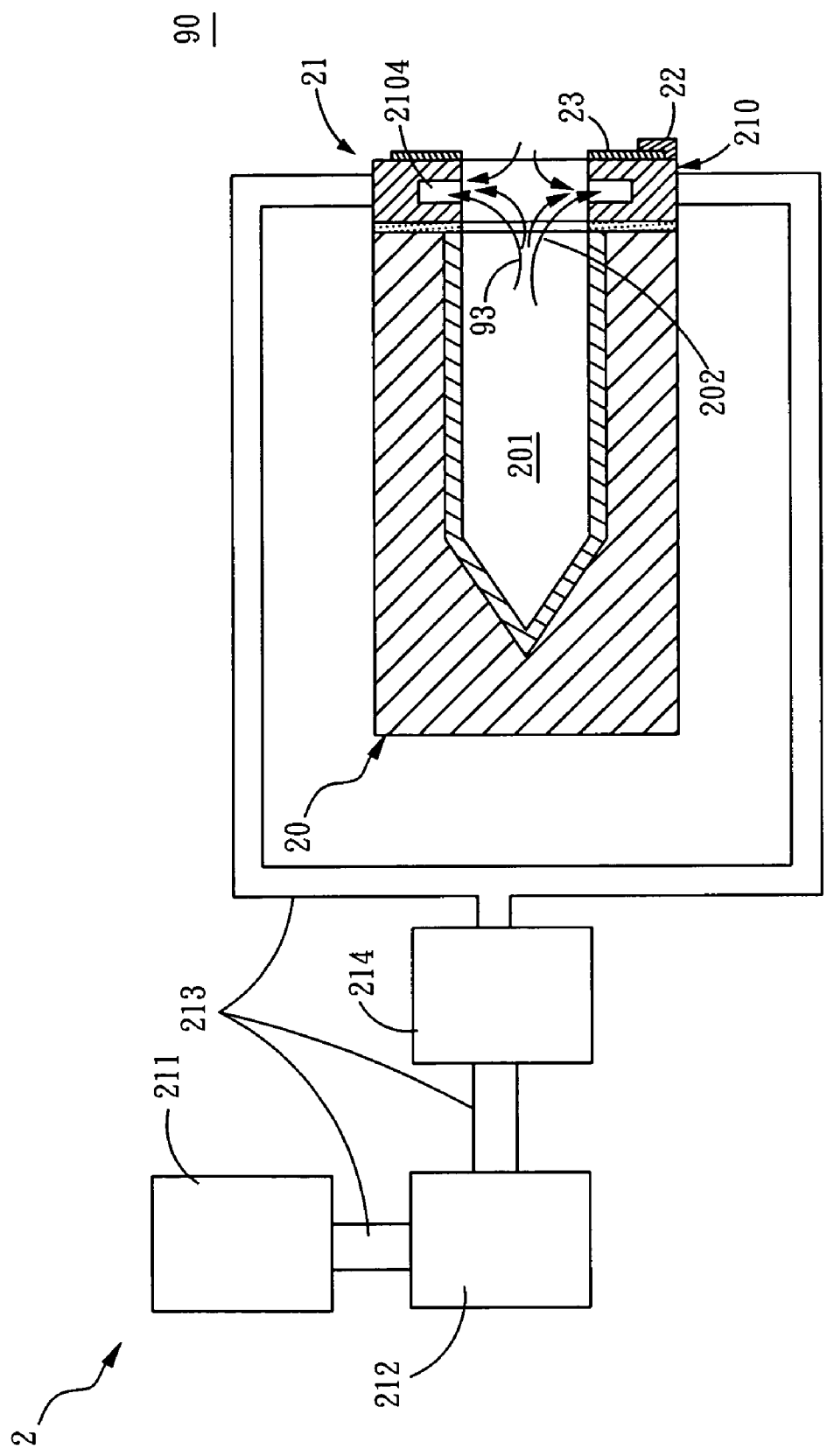

Please refer to FIG. 6A to FIG. 6B, which are a serial of schematic diagrams showing successive steps of an operating radiation apparatus with capability of preventing heat convention according to a first embodiment of the invention. In FIG. 6A, the radiation apparatus is operating in a condition that the cavity's temperature is lower than the ambient temperature. It is noted that when the temperature of the cavity 201 is lower than its ambient temperature, by convention effect, gases outside the cavity 201 will flow into the blackbody furnace 20 for heat exchange and thus cause mist to be formed on the wall of the blackbody furnace 20. In certain extreme conditions when the blackbody radiator's temperature is lower than 0° C., mist will become frost and ice that is going to cause damage to the blackbody furnace 20. In the meantime, the gas controller 211 will be activated for generating air flow to travel pass the tube 213 to arrive at the pressure adjuster 210 so as to form an air curtain 91 at the opening of the cavity 201 for blocking those air flows trying to enter the cavity 201 for heat exchanging from its surrounding environment 90 and thus enabling the temperature of the blackbody furnace 20 to remain stable.

In FIG. 6B, the radiation apparatus is operating in a condition that the blackbody furnace's temperature is higher than the ambient temperature. It is noted that when the cavity's temperature is higher than its ambient temperature, also by convention, heat exchanging is going to happen between the gases inside the blackbody furnace 20 and those outside the same, and since the ambient temperature of the blackbody furnace 20 is easily affected by air flow and other environmental factors so that it is varying, such heat exchanging will cause temperature drift to the blackbody furnace 20. Therefore, the gas controller 211 will be activate to perform an air-extracting operation for providing a negative-pressure air-curtain 90 at the opening of the cavity 201 so as to enable the temperature of the blackbody furnace 20 to remain stable for preparing the same for calibration and test.

Figure 1:
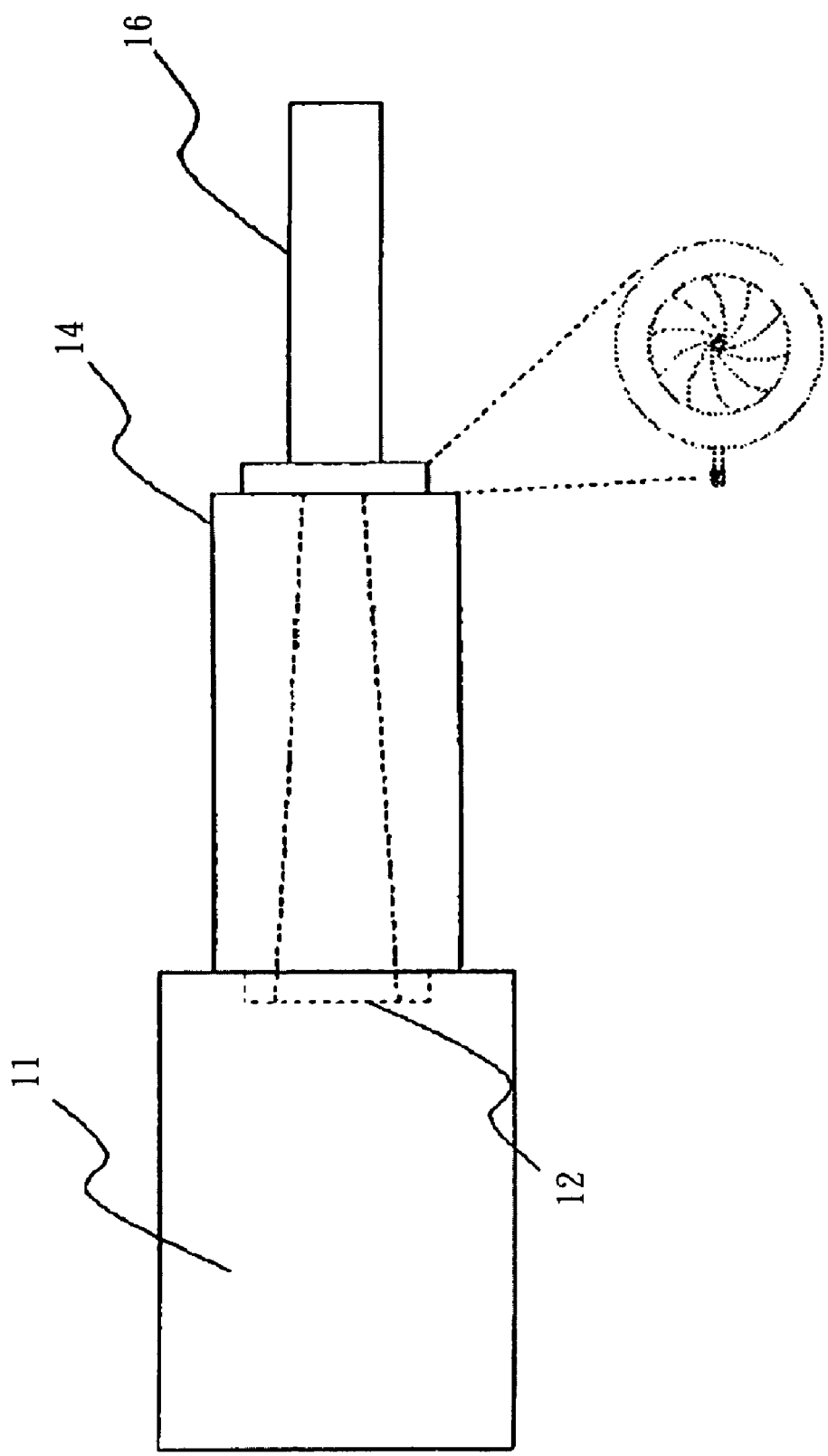
FIG. 1 shows a conventional standard radiation apparatus.
Figure 7:
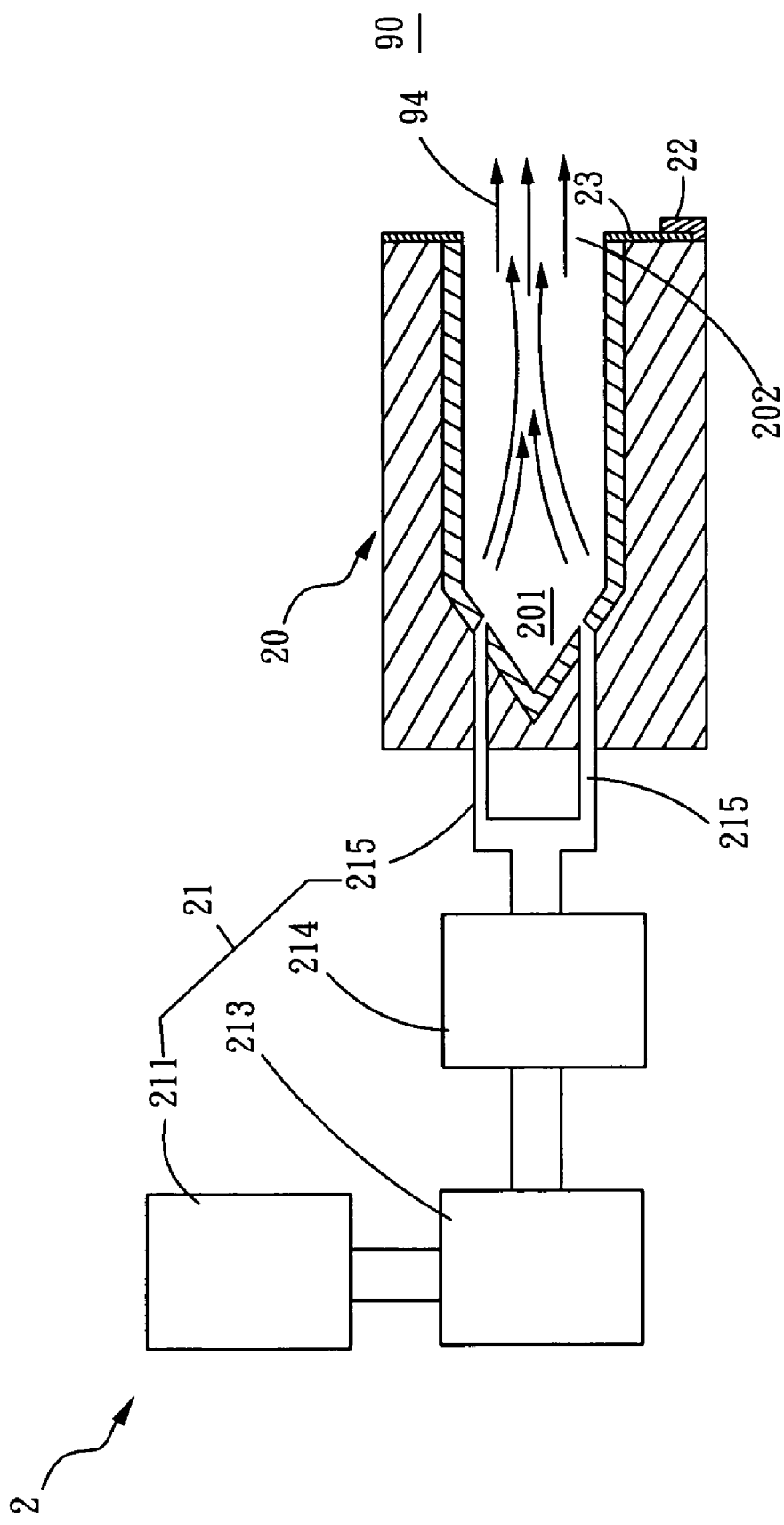
FIG. 7 is a side view of a radiation apparatus with capability of preventing heat convention according to a second embodiment of the invention.

Please refer to FIG. 7, which is a side view of a radiation apparatus with capability of preventing heat convention according to a second embodiment of the invention. In this embodiment, the blackbody furnace 20 is structured the same as that shown in FIG. 2 and thus is not describe further herein, and the air pressure adjusting unit 21 is composed of a gas supply tube 215, a gas controller 211, a temperature controller 212 and a flow controller 214 in which the gas controller 211, the temperature controller 212 and the flow controller 214 are all structured the same as those shown in FIG. 2 and thus are not describe further herein. The difference between the present embodiment and that shown in FIG. 1 is that: by connecting the gas supply tube 215 to a side of the blackbody furnace 20 while enabling the same to be in communication with the cavity 201, the gas supply tube 205 can supply the air flow of the gas controller 211 to blow into the cavity 201 and thus prevent heat convection from happening between the cavity 201 and its ambient environment 90. Moreover, a nozzle is arranged at the exit of the gas supply tube 215 for generating high-speed air flow. It is noted that the manifolds of the gas supply tube 215 is determined depending upon actual requirement and is not limited by those shown in the present embodiment. In addition, there is a plate gutter 22 formed at a position of the blackbody furnace 20 outside the cavity's opening, which is provided for allowing a baffle plate 23 to inset therein. As the plate gutter 22 can be used for insetting different baffle plates 23 configured with a hole of different diameters, the diameter of the cavity's opening can be changed accordingly for matching the calibration requirements of different thermometers. The baffle plate 23 of this embodiment is structured the same as that shown in FIG. 2 and thus is not described further herein.

When the radiation apparatus of FIG. 7 is operating at a condition that there are temperature difference between its cavity 201 and its ambient environment 90, the gas controller will be activated for preventing heat convention from happening between the cavity 201 and its ambient environment 90 and thus enabling the temperature of the blackbody furnace 20 to remain stable in a manner that air flow caused by the gas controller 211 will travel pass the gas supply tube 215 and into the cavity 201 to form an air-flow 94 blowing toward the opening of the cavity 201 and into its ambient environment 90 for blocking those air flows trying to enter the cavity 201 for heat exchanging from its surrounding environment 90 and thus enabling the temperature of the blackbody furnace 20 to remain stable.

Figure 8:
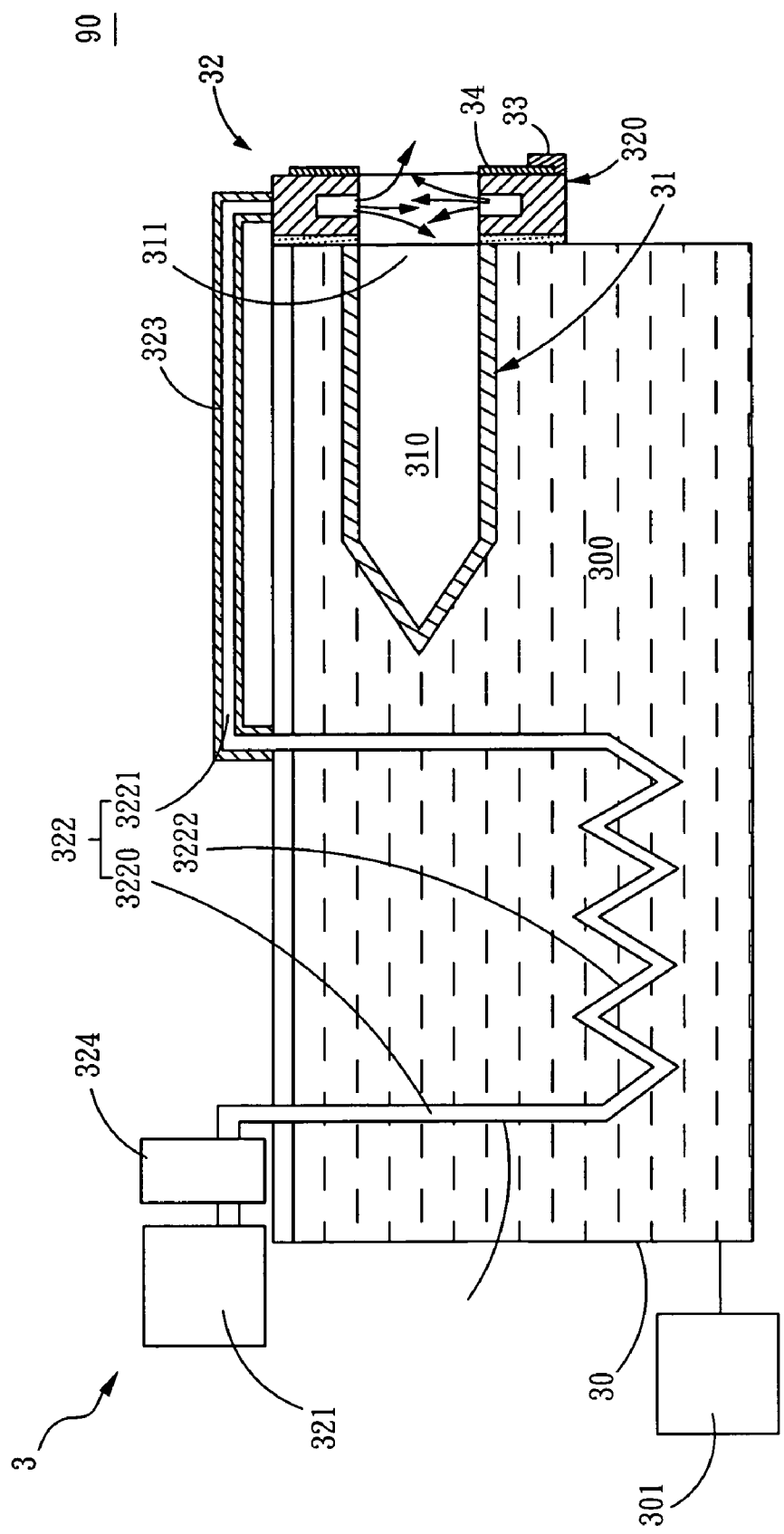
FIG. 8 is a side view of a radiation apparatus with capability of preventing heat convention according to a third embodiment of the invention.

Please refer to FIG. 8, which is a side view of a radiation apparatus with capability of preventing heat convention according to a third embodiment of the invention. In this embodiment, the radiation apparatus 3 comprises: a storage tank 30, a blackbody furnace 31 and an air pressure adjusting unit 32. The storage tank 30 is used for storing a fluid 300 which is selected with respect to the working temperature of the blackbody furnace 31. For instance, water is selected to be the fluid when the blackbody furnace 31 is working at normal atmospheric temperature, but is not limited thereby. The storage tank 30 is connected to a temperature controller 301 that is used for controlling the temperature of the fluid 300 and thus controlling the temperature of the blackbody furnace 31. It is noted that the temperature controller 301 can be configured with heating plate or heating tube for heating the fluid 300. The blackbody furnace 31 is received inside the storage tank 30 and maintains heat balance with the fluid 300. In addition, the blackbody furnace 31 has a cavity 310 formed therein whose opening 311 is located at a sidewall of the storage tank 30.

The air pressure adjusting unit 32 is connected to the blackbody furnace 31 in a manner that the air pressure adjusting unit 32 is able to adjust the air pressure at the opening of the cavity 310 according to the temperature difference between the cavity 310 and the ambient environment surrounding the blackbody furnace 31. In this embodiment, the air pressure adjusting unit 32 further comprises a pressure adjuster 320 and a gas controller 321. The pressure adjuster 320 is disposed at the opening 311 of the cavity 310 which is structured the same as that shown in FIG. 2 and thus is not described further herein. The gas controller 321 is connected to the pressure adjuster 310 by a tube 322 for enabling the same to base upon the temperature difference between the cavity 311 and the ambient environment surrounding the blackbody furnace 31 to perform an operation selected from the group consisting: performing an air-blowing operation to provide a gas to the pressure adjuster 320 for generating an air curtain; performing an air-extracting operation to draw the gas out of the pressure adjuster 320 for generating a negative pressure.

In the embodiment shown in FIG. 8, the tube 322 can be divided into two sections, i.e. the first section 3220 and the second section 3221. The first section 3220 is the portion of the tube 322 being received inside the storage tank 30, and the second section 3221 is the section exposed outside the storage tank 30 and connected to the pressure adjuster 320. The first section 3220 can absorb heat transferred from the fluid 300 and maintain at a temperature the same as that of the blackbody furnace 31. In addition, the first section 3220 is configured with a zigzagging structure 3222 for increasing heating surface. It is noted that for preventing the temperature of the second section 3221 from affecting by surrounding environment, it is wrapped by a thermal insulating material. It is noted that the second section 3221 of the present embodiment is the same as the tube shown in FIG. 3A; and the pressure adjuster 320 of the embodiment is also the same as that shown in FIG. 3A. Moreover, according to the status of the cavity's opening, a flow controller 214 can be used for gas flow regulation for ensuring the formation of a stable positive-pressure air curtain or negative-pressure air curtain. Similarly, there is a plate gutter 33 formed at a position of the blackbody furnace 31 outside the cavity's opening 311, which is provided for allowing a baffle plate 34 to inset therein. As the plate gutter 33 can be used for insetting different baffle plates 34 configured with a hole of different diameters, the diameter of the cavity's opening can be changed accordingly for matching the calibration requirements of different thermometers. As for the operation of the aforesaid embodiment, it is the same as those shown in FIG. 6A and FIG. 6b and thus is not described further herein.

Figure 9:
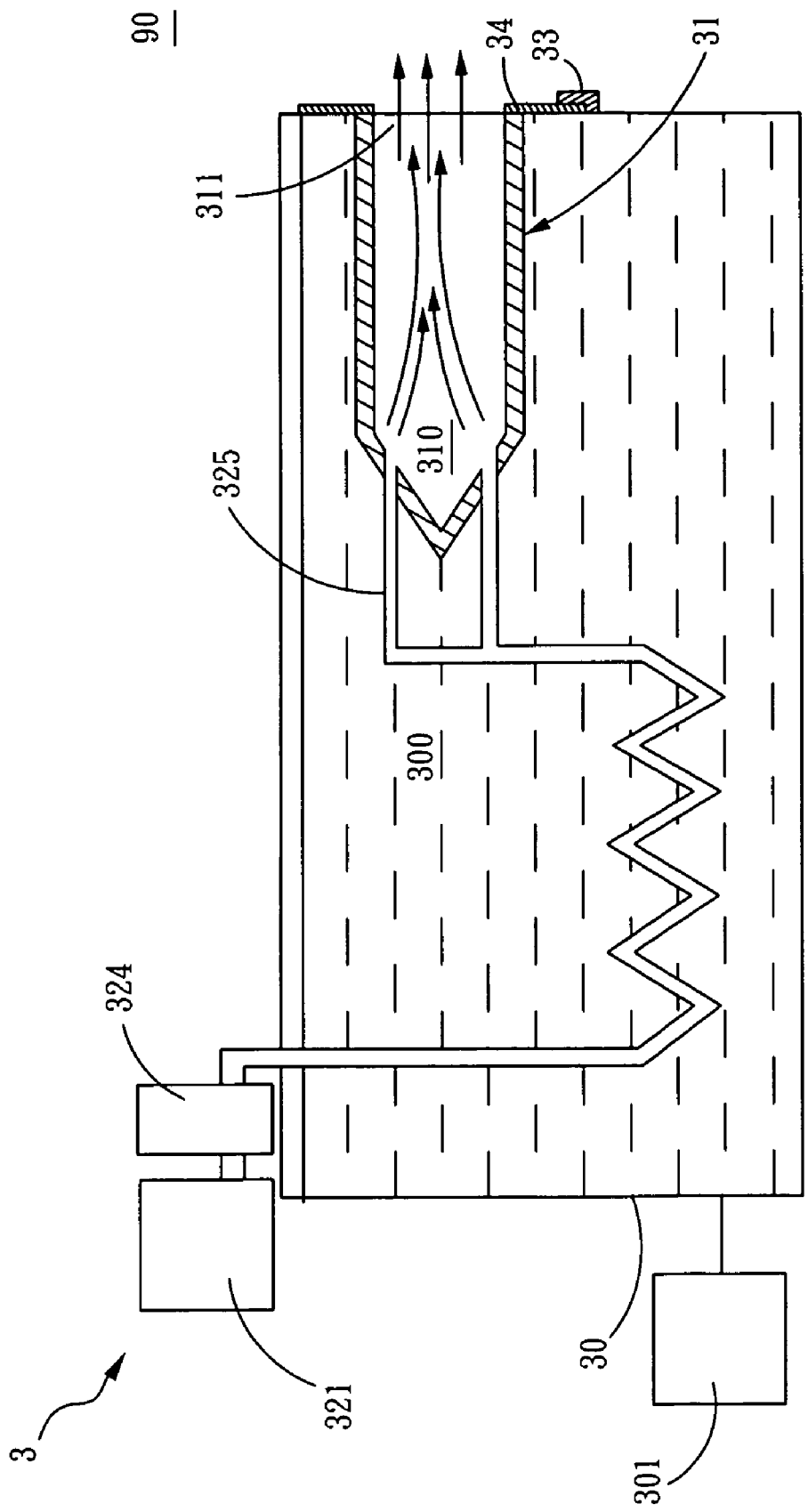
FIG. 9 is a side view of a radiation apparatus with capability of preventing heat convention according to a fourth embodiment of the invention.
Figure 10:
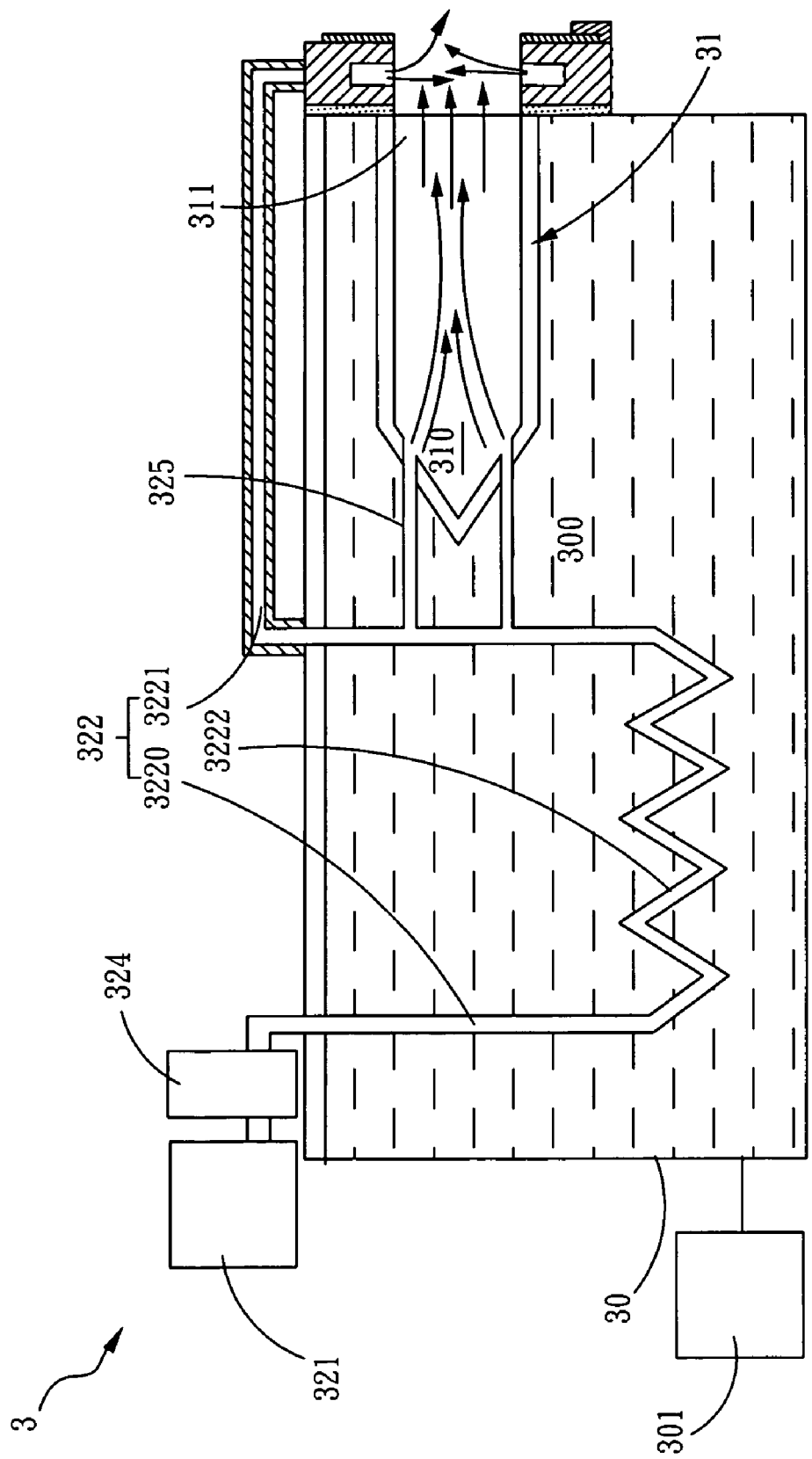
FIG. 10 is a side view of a radiation apparatus with capability of preventing heat convention according to a fifth embodiment of the invention.

Please refer to FIG. 9, which is a side view of a radiation apparatus with capability of preventing heat convention according to a fourth embodiment of the invention. In this embodiment, the radiation apparatus 3 comprises: a storage tank 30, a blackbody furnace 31 and an air pressure adjusting unit 32. As shown in FIG. 9, the storage tank 30 and the blackbody furnace 31 are all structured the same as those shown in FIG. 6, but only the air pressure adjusting unit 32 is not as it is comprised of a gas supply tube 325, a gas controller 321 and a flow controller 324. The present embodiment is characterized in that: it uses a gas supply tube, the same as the one shown in FIG. 5, to replace the pressure adjuster of FIG. 6. In this embodiment, the gas supply tube 325 is soaked in the fluid 300 for absorbing heating transferred from the fluid 300 for enabling the gas traveling therein to maintain at a temperature equal to the blackbody furnace 31. As the gas supply tube 325 is soaked in the fluid 300, it is not required to be wrapped by a head insolating material. By the gas supply tube 325, the air flow of the gas controller 321 can be guided to travel into the cavity 310 so as to form an air-flow blowing toward the opening of the cavity 310 and into its ambient environment 90 for blocking those air flows trying to enter the cavity 310 for heat exchanging from its surrounding environment 90 and thus enabling the temperature of the blackbody furnace 31 to remain stable. As for the operation of the aforesaid embodiment, it is the same as those shown in FIG. 7 and thus is not described further herein. In addition, the embodiment shown in FIG. 10 is an integrated structure combining the structures of FIG. 8 and FIG. 9, which is also used for enabling the temperature of its blackbody furnace to remain stable.

To sum up, the present invention provides a radiation apparatus with capability of preventing heat convention, configured with a mechanism capable of generating either a positive-press air curtain or a negative-pressure air curtain to be used for enabling the temperature of its blackbody furnace to remain stable, by which not only the performance of the blackbody furnace is enhanced, but also the blackbody furnace is able to act as a blackbody radiator with high temperature stability to be used for calibration.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A radiation apparatus with capability of preventing heat convention, comprising:

a blackbody furnace, having a cavity formed therein; and an air pressure adjusting unit, coupled to the blackbody furnace for adjusting the air pressure at the opening of the cavity according to the temperature difference between the cavity and the ambient environment surrounding the blackbody furnace.

2. The radiation apparatus of claim 1, wherein the air pressure adjusting unit further comprises:
- a pressure adjuster, disposed at the opening of the cavity;
- a gas controller, coupled to the pressure adjuster by a tube for enabling the same to base upon the temperature difference between the cavity and the ambient environment surrounding the blackbody furnace to perform an operation selected from the group consisting: performing an air-blowing operation to provide a gas to the pressure adjuster for generating an air curtain; performing an air-extracting operation to draw the gas out of the pressure adjuster for generating a negative pressure; and
- a temperature controller, coupled to the gas controller for controlling the gas temperature of the gas controller.

3. The radiation apparatus of claim 2, wherein the tube is wrapped by a thermal insulating material.

4. The radiation apparatus of claim 2, further comprising:
- a flow controller, coupled to the gas controller for regulating the amount of gas blowing by the gas controller when the gas controller is performing the air-blowing operation and for regulating the magnitude of the negative pressure when the gas controller is performing the air-extracting operation.

5. The radiation apparatus of claim 2, wherein the pressure adjuster further comprises at least a nozzle.

6. The radiation apparatus of claim 2, further comprising:
- a plate gutter, disposed at a position outside the pressure adjuster and provided for a baffle plate with opening to inset therein.

7. The radiation apparatus of claim 1, wherein the air pressure adjusting unit further comprises:
- a gas supply tube, coupled to an end of the cavity;
- a gas controller, coupled to the gas supply tube for enabling the same to base upon the temperature difference between the cavity and the ambient environment surrounding the blackbody furnace to provide a gas to the gas supply tube; and
- a temperature controller, coupled to the gas controller for controlling the gas temperature of the gas controller.

8. The radiation apparatus of claim 7, wherein the gas supply tube is wrapped by a thermal insulating material.

9. The radiation apparatus of claim 7, further comprising:
- a flow controller, coupled to the gas controller for regulating the flow of the gas controller.

10. The radiation apparatus of claim 7, further comprising:
- a plate gutter, disposed at a position outside the pressure adjuster and provided for a baffle plate with opening to inset therein.

11. A radiation apparatus with capability of preventing heat convention, comprising:
- a storage tank, for storing a fluid;
- a blackbody furnace, having a cavity formed therein and being arranged inside the storage tank in a manner that an opening of the cavity is located at a sidewall of the storage tank; and
- an air pressure adjusting unit, coupled to the blackbody furnace for adjusting the air pressure at the opening of the cavity according to the temperature difference between the cavity and the ambient environment surrounding the blackbody furnace.

12. The radiation apparatus of claim 11, wherein the air pressure adjusting unit further comprises:
- a pressure adjuster, disposed at the opening of the cavity; and
- a gas controller, coupled to the pressure adjuster by a tube for enabling the same to base upon the temperature difference between the cavity and the ambient environment surrounding the blackbody furnace to perform an operation selected from the group consisting: performing an air-blowing operation to provide a gas to the pressure adjuster for generating an air curtain; performing an air-extracting operation to draw the gas out of the pressure adjuster for generating a negative pressure.

13. The radiation apparatus of claim 12, wherein a portion of the tube is inserted into the interior of the storage tank while the rest of the tube that is not inserted into the storage tank is wrapped by a thermal insulating material.

14. The radiation apparatus of claim 12, further comprising:
- a flow controller, coupled to the gas controller for regulating the amount of gas blowing by the gas controller when the gas controller is performing the air-blowing operation and for regulating the magnitude of the negative pressure when the gas controller is performing the air-extracting operation.

15. The radiation apparatus of claim 12, wherein the pressure adjuster further comprises at least a nozzle.

16. The radiation apparatus of claim 12, further comprising:
- a plate gutter, disposed at a position outside the pressure adjuster and provided for a baffle plate with opening to inset therein.

17. The radiation apparatus of claim 11, wherein the air pressure adjusting unit further comprises:
- a gas supply tube, coupled to an end of the cavity; and
- a gas controller, coupled to the gas supply tube for enabling the same to base upon the temperature difference between the cavity and the ambient environment surrounding the blackbody furnace to provide a gas to the gas supply tube.

18. The radiation apparatus of claim 17, further comprising:
- a flow controller, coupled to the gas controller for regulating the flow of the gas controller.

19. The radiation apparatus of claim 17, further comprising:
- a plate gutter, disposed at a position outside the pressure adjuster and provided for a baffle plate with opening to inset therein.

20. The radiation apparatus of claim 17, wherein a nozzle is arranged at the exit of the gas supply tube.

* * * * *